United States Patent [19]

Abu-Akeel et al.

[11] 4,218,166
[45] Aug. 19, 1980

[54] GUIDE DEVICE FOR MULTI-AXIS MANIPULATOR

[75] Inventors: Abdulhadi K. Abu-Akeel, Sterling Heights; Thomas Barrowman, Warren; Gerald C. Rieck, Sterling Heights, all of Mich.

[73] Assignee: General Motors Corporation, Detroit, Mich.

[21] Appl. No.: 963,430

[22] Filed: Nov. 24, 1978

[51] Int. Cl.² .................................................. B25J 19/00
[52] U.S. Cl. ................................... 414/1; 414/918; 138/113; 138/114; 248/278
[58] Field of Search ........................... 414/1-8, 414/680, 689, 729, 918; 138/113, 114, 118; 285/131, 136, 137 R; 248/68 R, 278, 280.1, 281.1, 284, 291; 254/134.3 FT, 134.3 R, 190 R; 137/355.17, 343

[56] References Cited

U.S. PATENT DOCUMENTS

| | | | |
|---|---|---|---|
| 1,856,109 | 5/1932 | Murray | 138/113 X |
| 2,632,574 | 3/1953 | Goertz | 414/7 |
| 3,712,481 | 1/1973 | Harwood | 414/7 X |
| 3,949,778 | 4/1976 | Woodford | 285/138 X |
| 3,999,784 | 12/1976 | Kennedy | 285/137 R X |
| 4,036,617 | 7/1977 | Leonard | 138/113 X |
| 4,156,436 | 5/1979 | Hawk | 248/68 R X |

Primary Examiner—Stephen G. Kunin
Assistant Examiner—Terrance L. Siemens
Attorney, Agent, or Firm—Edward J. Biskup

[57] ABSTRACT

A guide device for the supply lines that lead to the work tool at the work end of a multi-axis manipulator's boom. The guide device includes a slidable block positioned to the rear of the wrist assembly of the boom and connected by a flexible cable to the work tool for controlling bending of the supply lines so as to minimize twisting thereof as the work tool is moved about a pair of intersecting axes.

2 Claims, 4 Drawing Figures

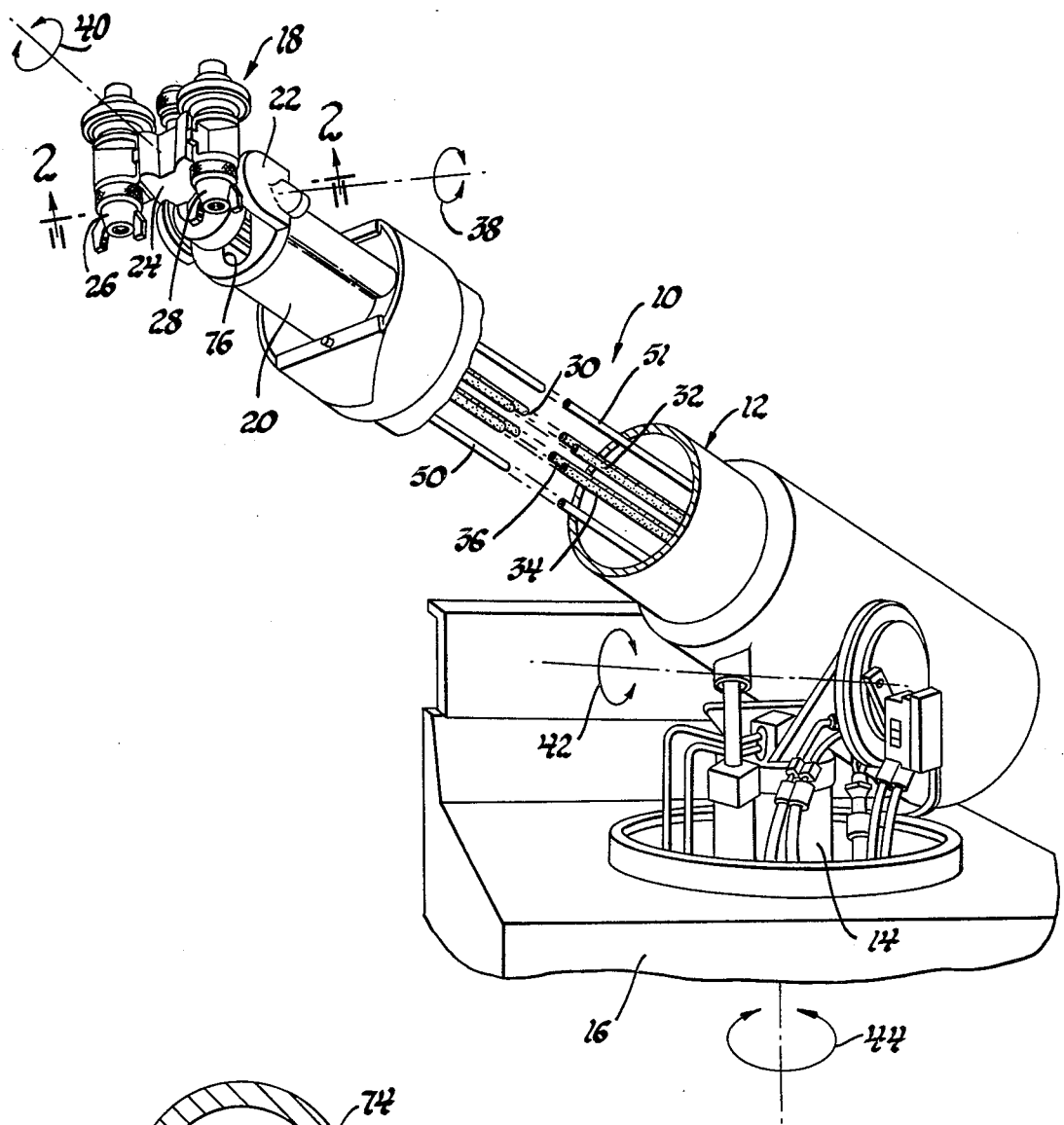
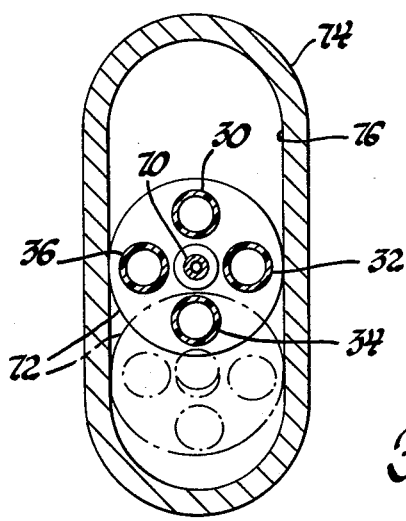
Fig.1
Fig.4

GUIDE DEVICE FOR MULTI-AXIS MANIPULATOR

This invention concerns multi-axis manipulators and more particularly a guide device that is mounted at the work end of the boom of a multi-axis manipulator and allows the supply lines leading to the work tool to be enclosed within the boom while minimizing twisting and bending of the hoses during movement of the work tool about a pair of mutually perpendicular axes.

At the present time, when a multi-axis manipulator is used for paint spraying or welding, the supply lines, such as the air and paint hoses carried by the manipulator when used for painting purposes and the electric cables in the case where the manipulator is used as a welder, are routed along the outside of the boom and allowed to hang loose. As a result, large loops are required in the supply lines so as to allow various motions of the work tool. The problem with an arrangement of this type is that quite often the supply lines are caught on the object being worked on or on other objects which may be close by. In addition, the large loops in the supply lines limit the use of the manipulator in that the boom is frequently prevented from being positioned within confined areas. Another problem that occurs in the case of the paint spray manipulator is that the loose and exposed hoses are a source of dirt due to dried paint flaking off the hoses and contaminating the freshly painted surface.

The present invention is directed to a guide device which alleviates the above problems by allowing the supply lines to be incorporated within the boom of the manipulator adjacent the usual wrist assembly. The guide device minimizes twisting and bending of the supply lines when the work tool is pivoted about the various axes of freedom provided by the manipulator, and by so doing, a more efficient manipulator utilization is realized.

More specifically, the guide device according to the present invention is combined with a multi-axis manipulator having an elongated arm that terminates with a wrist assembly for pivoting a carrier about a first axis and for rotating an output shaft about a second axis that is perpendicular to the first axis. A work tool, such as a spray gun, is connected to the output shaft and a plurality of flexible hoses are located within the arm and are connected to the spray gun for providing coating material and compressed air thereto. The guide device is located within the wrist assembly for supporting a portion of the hoses and for minimizing twisting and bending of the hoses when the spray gun is moved about the first and second axes. The guide device includes a block member which is mounted in the arm rearwardly of the wrist assembly and serves to support the hose for limited rotational and sliding movement relative to the arm. A motion transmitting means, which can take the form of a flexible cable, is connected at one end to the spray gun unit and is connected at the other end to the block member so as to cause corresponding rotative movement thereof when the spray gun is rotated by the output shaft about the second axis and to cause limited sliding movement of the block member along a vertical axis when the carrier is pivoted about the first axis.

The objects of the present invention are to provide a new and improved guide device for a multi-axis manipulator which allows the supply lines to be packaged within the boom and prevents excessive twisting of the supply lines during movement of the work tool; to provide a new and improved guide device that is located at the work end of the boom of a multi-axis manipulator and includes a slidable block which spaces the supply lines leading to the work tool and controls angular displacement of the supply lines so as to minimize bending stresses therein during movement of the work tool; to provide a new and improved guide device for the fluid or power supply lines which are connected with the work tool at the work end of a manipulator's boom and which allow movement of the work tool about two intersecting and mutually perpendicular axes without causing undue twisting of the supply lines; and to provide a new and improved guide device for the supply lines of a multi-axis manipulator that is located at the wrist assembly of the boom and serves to control bending of the supply lines so as to minimize twisting thereof as the work tool is moved about a pair of intersecting axes.

Other objects of the invention will be more apparent from the following detailed description when taken with the drawings in which:

FIG. 1 is a perspective view showing a multi-axis manipulator equipped with a supply line guide device made according to the invention;

FIG. 4 is a view of a portion of the guide device taken on line 4—4 of FIG. 2.

Figure 2:
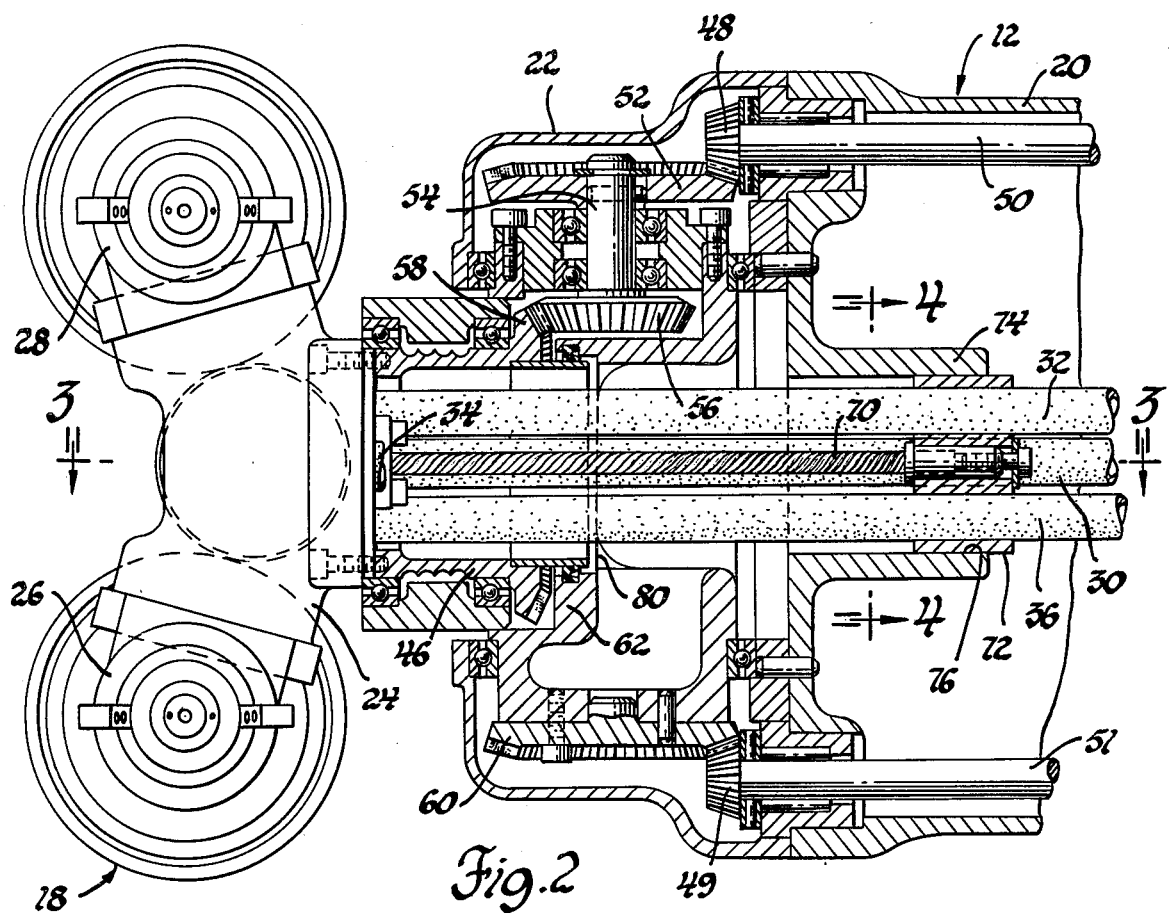
FIG. 2 is an enlarged view taken on line 2—2 of FIG. 1 showing the guide device located in the wrist assembly of the manipulator's boom.

Referring to the drawings and more particularly FIG. 1 thereof, a multi-axis manipulator 10 is shown which is suitable for programmed control movement to achieve universal work processing relationship with respect to objects such as a motor vehicle, not shown. The manipulator 10 comprises an enlongated boom or support arm 12 which has the rear end thereof mounted on a pedestal type base 14 that extends into a housing 16. The housing 16 includes the usual controls for automatically causing the work end of the manipulator 10 to move along various axes under the control of a program. Inasmuch as the controls form no part of the present invention, further description will proceed with reference to the mechanical parts of the manipulator 10 that provide the requisite movement of a work tool attached to the boom 12 such as a spray gun unit 18.

The support arm 12 includes an elongated tubular member 20 which terminates at its outer end with a wrist assembly 22, which in turn, supports the spray gun unit 18. The spray gun unit includes a manifold 24 which has suitable passages formed therein for delivering pressurized air and paint to two identical spray heads 26 and 28 of the spray gun unit 18. In this case, four flexible lines or hoses 30, 32, 34 and 36 serve as conduits for supplying the paint and pressurized air to the manifold 24 from a source, not shown. The wrist assembly 22 includes a gear unit which serves to rotate the spray gun unit 18 along a first circular path 38 and along a second circular path 40. In addition, the rearward end of the arm 12 is pivotally supported on the base 14 so as to provide pivotal movement of the entire arm 12 about a horizontal axis along a circular path 42. The base 14 is also rotatable about a vertical axis along a circular path 44 so that the entire support arm 12 can swing in an arc and position the spray gun unit 18 at different locations.

Figure 3:
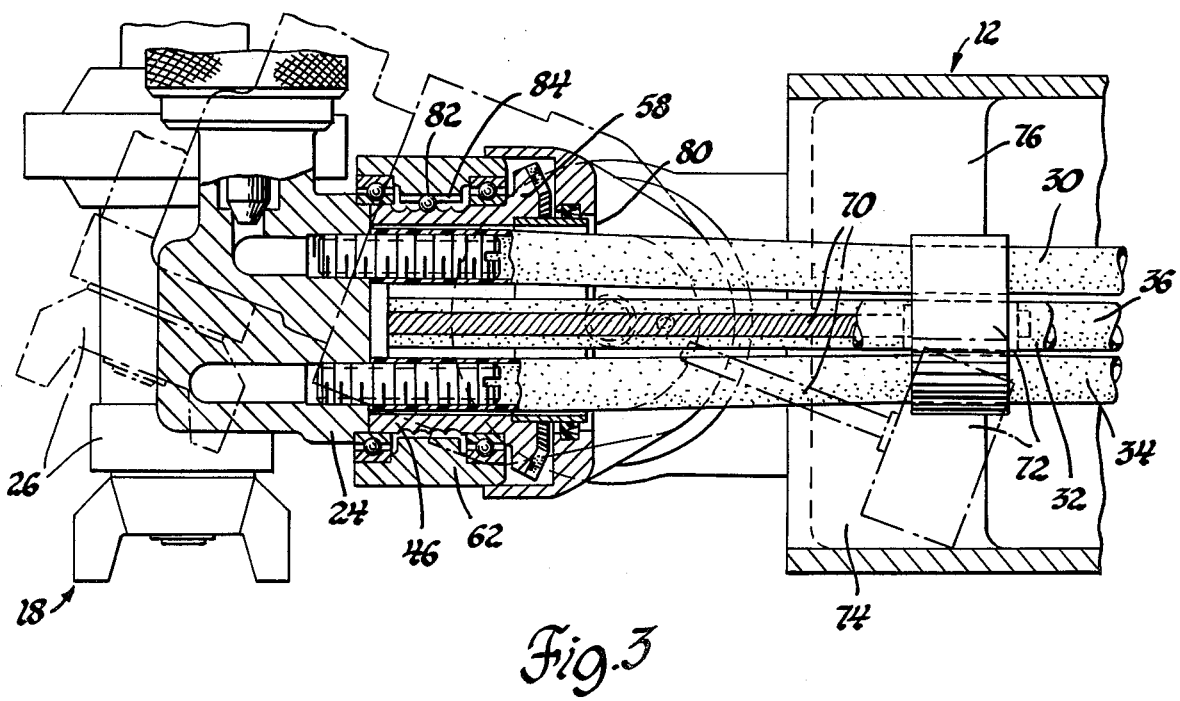
FIG. 3 is a side view of the guide device taken on line 3—3 of FIG. 2.

Thus, it should be apparent from the above description that the manipulator 10 has four degrees of freedom which permit the machine to perform spraying operations in various locations. Also, the wrist assembly 22 provides two of the four degrees of freedom which are realized through the aforementioned gear unit. In this connection, it will be noted that the manifold 24 of the spray gun unit 18 is rigidly connected to an output shaft 46 which forms a part of the gear unit and causes rotation of the spray gun unit about the circular path 40. The gear unit also causes the spray gun unit 18 to rotate along the path 38, and as seen in FIGS. 2 and 3, the gear unit of interest comprises a pair of identical gears 48 and 49 which are rigid with rotatable drive shafts 50 and 51 respectively and are supported for rotation within the support arm 12. The gear 48 meshes with a bevel gear 52 which is fixed to a rotatable shaft 54 the inner end of which rigidly carries a bevel gear 56. The gear 56 meshes with a bevel gear 58 which is fixed to the output shaft 46. Thus, by rotatably driving gear 48, the gear 56 is rotated to provide rotating movement of the output shaft 46 and, accordingly, the spray gun unit 18 along circular path 40. As to realizing rotation of the spray gun unit 18 along path 38, it will be noted that the gear 49 meshes with a bevel gear 60 which is secured to the inner housing 62 of the wrist assembly 22. The inner housing 62 forms a part of a carrier which supports the shafts 46 and 54 so that upon rotatably driving both gears 48 and 49 simultaneously in opposite directions, the carrier is rotated in the path 38 so that the spray gun unit 18 is pivoted about a horizontal center axis passing through the shaft 54.

In order to minimize twisting and bending of the hoses 30 through 36 during movement of the spray gun unit 18 along circular paths 38 and 40, a guide device is provided at the wrist assembly 22. As seen in FIGS. 2 through 4, the guide device includes an elongated flexible cable 70 and a cylindrical block member 72. One end of the cable 70 is rigidly connected to the manifold 24 of the spray gun unit 18 while the other end of the cable is rigidly connected to the block member 72. The cable 70 is located in axial alignment with the longitudinal center axis of the output shaft 46 and it will be noted that the hoses 30 through 36 extend through suitable bores formed in the block member 72 that are circumferentially equally spaced from each other as best seen in FIG. 4. The bores in the block member 72 are slightly larger in diameter than the outer diameter of the hoses 30 through 36 so that each of the latter can slide axially relative to its accommodating bore. It will be understood that sufficient slack shall be in the portion of the hoses located within the arm 12 to allow the axial movement of the hoses relative to the block member 72 during movement of the spray gun unit 18. It will also be noted that the block member 72 is positioned within a support member 74 which is rigidly connected with the boom 12 and is located to the rear of the wrist assembly 22. As seen in FIG. 4, the support member has the central portion thereof formed with a vertically oriented oblong opening 76 which allows movement of the block member 72 along vertical axis.

In operation, when the output shaft 46 and the attached spray gun unit 18 is rotated along circular path 40, the cable 70 causes the block member 72 to be rotated within opening 76 so as to maintain the same angular relationship between the hoses at the manifold 24 and at the block member 72. Twisting of the cables will occur within the boom 12, however, the guide device prevents a twist within the wrist assembly 22 which could interfere with supply of paint or air to the manifold 24.

In addition, when the spray gun unit 18 is rotated along the circular path 38, the bending of the hoses 30 through 36 and the flexible cable 70 forces the block member 72 to slide along a vertical axis within the opening 76 while the hoses are free to slide through the block member as required. Thus, as seen in FIGS. 3 and 4, when the spray gun unit 18 is rotated in a counterclockwise direction about the center axis of the shaft 54 to the phantom line position, the cable 70 causes the block member 72 to move downwardly within the opening 76 in support member 74. The final position of the block member 72 will be determined by the position of the spray gun unit 18 and the bend radius of the hoses 30 through 36 and the cable 70. It has been found that the block member 72 will assume a position that minimizes the bending stresses in the hoses.

It will be noted that one guide device made according to the invention for use with a spray gun unit 18 such as shown in FIGS. 1 through 4 used a cable 70 similar to a speedometer flexible shafting cable that had a diameter which measured 0.156 inches and had a working length of 4.25 inches. The block member had a diameter which measured 1.375 inches and the opening 76 measured approximately 3.75 inches along its major axis. The hoses 30 through 36 were made by Penntube Plastics Company, of Clifton Heights, Pennsylvania and were identified as Con-T convoluted TFE hose FH0130-4. In addition, a disk-shaped spacer member 80 was provided intermediate the manifold 24 and the block member 72 for spacing this portion of the hoses 30 through 36. The spacer member 80 was rotatably supported by the inner housing 62 and included suitable holes for allowing the hoses 30 through 36 as well as the cable 70 to pass therethrough while permitting relative axial movement therebetween. Depending upon the stiffness of the hoses and the number used and also the working length of the cable 70, the spacer member may or may not be required to be used with the guide device. In this case, the spacer member helped maintain orientation of the hoses and prevented a rubbing of the hoses used against the cable 70.

Finally, it will be noted that the output shaft 46 is limited in rotation by a stop arrangement which includes a metallic ball 82 which is located within an axially extending groove 84 formed in the portion of the inner housing 62 which rotatably supports the output shaft 46. The ball 82 is adapted to cooperate with a spiral track formed in the outer peripheral portion of the output shaft 46 for limiting rotation of the latter to two complete revolutions in either direction from a neutral point as seen in FIG. 3. Thus, as the output shaft 46 is rotated along circular path 40 in one direction or the other, the ball 82 moves axially from the position shown in FIG. 3 until it contacts one of the bearings at which point further rotation is prevented.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a multi-axis manipulator having an elongated arm terminating with a wrist assembly that includes a gear unit for pivoting a carrier about a first axis and for rotating an output shaft about a second axis which is perpendicular to said first axis, a work tool connected to said output shaft, a plurality of flexible supply lines located within said arm and connected at one end to said work tool, the improvement wherein guide means are provided within said arm for supporting a portion of said supply lines and minimizing the strain on said supply lines when said work tool is moved about said first or second axis, said guide means including a block member mounted in said arm rearwardly of said wrist assembly for supporting the supply lines for limited rotative and sliding movement relative to said arm, a flexible motion transmitting means connected at one end to said work tool and connected at the other end to said block member so as to cause corresponding rotational movement of said block member when said work tool is rotated by the output shaft about said second axis and to cause sliding movement of said block member when said carrier is pivoted about said first axis so that bending stresses in the supply line are minimized.

2. In combination with a multi-axis manipulator having an elongated arm including a housing terminating with a wrist assembly that includes a gear unit for pivoting a carrier about a first axis and for rotating an output shaft about a second axis which is perpendicular to said first axis, a work tool rigidly connected to said output shaft, a plurality of flexible supply lines located within said arm and connected at one end to said work tool, the improvement wherein guide means are provided within said arm for supporting a portion of said supply line hoses and minimizing the strain on said supply lines when said work tool is moved about said first or second axis, said guide means including a cylindrical block member mounted in a slot formed in said housing of said arm rearwardly of said wrist assembly for supporting the supply line for limited rotative and sliding movement relative to said arm, an elongated flexible cable rigidly connected at one end to said work tool and rigidly connected at the other end to the center of said block member so as to cause corresponding rotational movement of said block member when said work tool is rotated by the output shaft about said second axis and to cause sliding movement of said block member within said slot when said carrier is pivoted about said first axis so that bending stresses in the supply lines are minimized.

* * * * *